Figure 5:
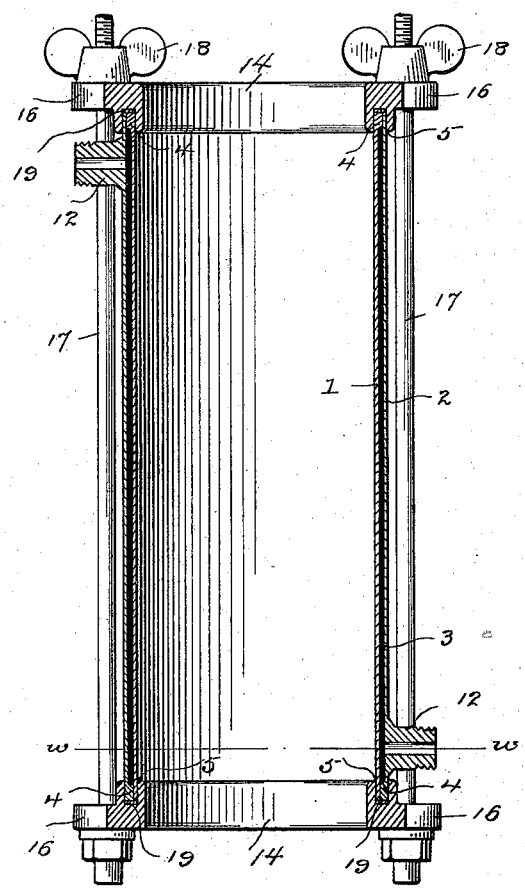

No. 608,169. Patented Aug. 2, 1898.
L. BAUMEISTER.
COOLER FOR BEVERAGES.
(Application filed May 17, 1897.)
(No Model.) 2 Sheets—Sheet 1.
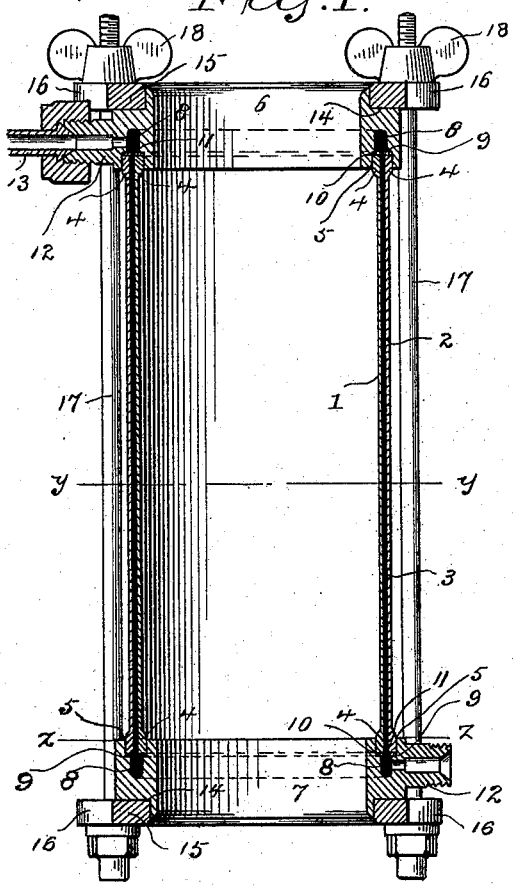
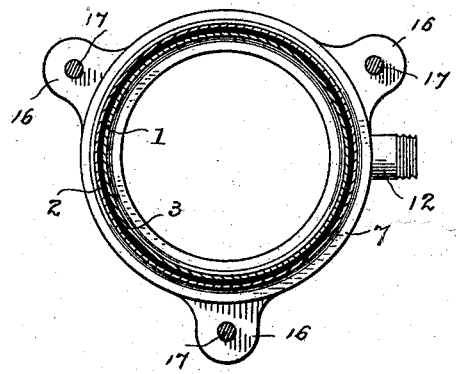
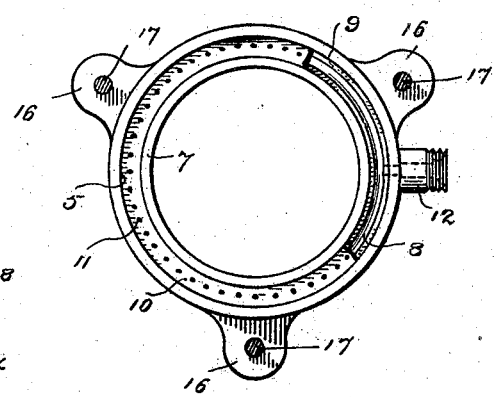
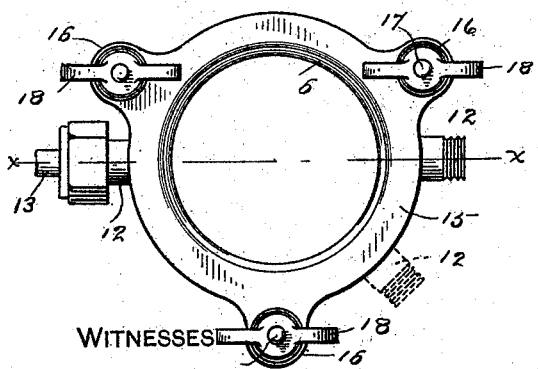
INVENTOR
Leopold Baumeister No. 608,169. Patented Aug. 2, 1898.
L. BAUMEISTER.
COOLER FOR BEVERAGES.
(Application filed May 17, 1897.)

(No Model.) 2 Sheets—Sheet 2.

WITNESSES
H. A. Lamb
S. V. Heley

INVENTOR
Leopold Baumeister
By A. M. Wooster
Atty.

THE NORRIS PETERS CO., PHOTO-LITHO., WASHINGTON, D. C.

UNITED STATES PATENT OFFICE.

LEOPOLD BAUMEISTER, OF BRIDGEPORT, CONNECTICUT, ASSIGNOR OF ONE-HALF TO JOHN F. SEIFERT, OF SAME PLACE.

COOLER FOR BEVERAGES.

SPECIFICATION forming part of Letters Patent No. 608,169, dated August 2, 1898.

Application filed May 17, 1897. Serial No. 636,848. (No model.)

*To all whom it may concern:*

Be it known that I, LEOPOLD BAUMEISTER, a citizen of the United States, residing at Bridgeport, in the county of Fairfield and State of Connecticut, have invented certain new and useful Improvements in Coolers for Beverages; and I do hereby declare the following to be a full, clear, and exact description of the invention, such as will enable others skilled in the art to which it appertains to make and use the same.

My invention has for its object to provide a device for cooling draft beverages—as, for example, beer, ale, soda-water, &c.—which shall be so constructed as to cool a small quantity of the beverage almost instantly, so that when drawn slowly but a small quantity of the beverage will remain in the cooler, and thereby become flat, but which even where the beverage is drawn glass after glass in quick succession will reduce the temperature of the beverage as low as is required to make it palatable, and which, moreover, shall be so constructed as to permit it to be conveniently taken apart for cleaning or for any purpose whatever.

With this end in view I have devised the novel cooler of which the following description, in connection with the accompanying drawings, is a specification, reference characters being used to designate the several parts.

Figure 6:
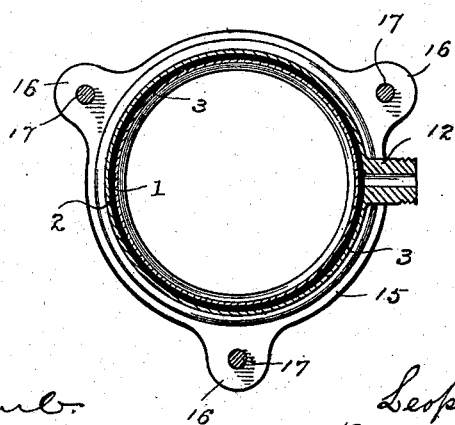

Figure 1 is a vertical section of one form of my novel cooler on the line $x$ $x$ in Fig. 2; Fig. 2, a plan view; Fig. 3, a section on the line $y$ $y$ in Fig. 1; Fig. 4, a section on the line $z$ $z$ in Fig. 1, the packing-washer being partly broken away and the cylinder removed; Fig. 5, a view corresponding with Fig. 1, but illustrating another form in which I have carried my invention into effect; and Fig. 6 is a section on the line $w$ $w$ in Fig. 5.

The essential principle of the device shown in the drawings lies in passing the beverage to be cooled between two concentric cylinders having a space between them, so that a thin sheet of the beverage is exposed on both sides to the cooling action of ice or, if preferred, a cooling mixture—for example, ice and salt—the interior of the inner cylinder being in practice packed with ice or a cooling mixture and ice, or a cooling mixture being packed about the outer cylinder.

1 denotes an inner cylinder, and 2 an outer cylinder. Between these cylinders is a cylindrical opening or space 3. In the form illustrated in Figs. 1 to 4, inclusive, the ends of the inner cylinder are provided on the inner side with enlargements 4 and the ends of the outer cylinder are provided on the outer side with similar enlargements. These enlargements rest in grooves 5 in an upper head 6 and in a lower head 7.

8 denotes inner grooves in the head, which open into grooves 5, said grooves 8 being narrower than grooves 5 and there being shoulders 9 between them. 10 denotes packing-washers which rest upon these shoulders. These washers may be made of leather, metal, or any suitable material and are provided with openings 11 to permit the passage of the beverage. Each of the heads in this form is provided with a hub 12 for the attachment of a receiving or delivering pipe, as at 13 at the upper left-hand corner of Fig. 1. The heads are both provided with recesses 14, which receive rings 15, each of which is provided with lugs 16, through which bolts 17 pass. The bolts are shown as provided with thumb-nuts 18 for convenience in securing the parts together.

The mode of assembling will be readily understood from the drawings. The cylinders are placed one within the other, the heads 6 and 7 are placed in position with the packing-washers between the ends of the cylinders and the shoulders, rings 15 are then placed in position, and the several parts are locked together by means of the bolts and thumb-nuts. It will be noticed that in this form the heads are wholly independent of the rings, so that by loosening the thumb-nuts either of the heads may be rotated, so as to place the hubs in any convenient position for the attachment of pipes, as indicated by dotted lines in Fig. 2, in which one of the hubs is shown in a changed position.

In the form illustrated in Figs. 5 and 6 hubs 12 are made integral with the outer cylinder at the opposite ends thereof instead of upon the heads; rings 15 are dispensed with, and lugs 16 are formed upon the heads. This form is somewhat simpler and less expensive, but does not permit the hubs to be moved as conveniently as in the other form. In this form the enlargements 4 at the ends of the cylinders are shown as placed on the outer side of the inner cylinder and on the inner side of the outer cylinder, grooves 8 are dispensed with, grooves 5 are made smaller, and the ends of the cylinders lie in these grooves with non-perforated washers 19 between the ends of the cylinders and the bases of the recesses.

In both of the forms of construction illustrated the cylinders are separable from each other, and therefore they may be readily cleaned after taking the cooler apart.

In use the cooler may be placed in any position—for example, in an upright position, as shown in the drawings. The cooler is preferably placed in a suitable box, so as to permit ice or a cooling mixture to be packed closely about it, it being also desirable that the space within the inner cylinder shall also be packed with ice or a cooling mixture, the heads being of course made open—that is, ring-shaped, as shown in the drawings—so as to permit ice or a cooling mixture to be conveniently placed within the inner cylinder.

Having thus described my invention, I claim—

1. A cooler for beverages comprising separable inner and outer concentric cylinders 1 and 2 having a space between them and provided with enlargements or thickened ends 4, ring-shaped or open heads having grooves to receive the thickened ends of said cylinders, packing-washers in the bottom of said grooves and against which the thickened ends of the cylinders rest, means for connecting receiving and delivering pipes with the cooler for sending a current of liquid through the space between the cylinders, and clamping connections outside of the outer cylinder for holding the heads and cylinders together.

2. A cooler for beverages comprising separable inner and outer cylinders having a space between them, ring-shaped or open heads having connecting-grooves 5 and 8 and shoulders 9, packing-washers having openings 11 lying between the ends of the cylinders and the shoulders, hubs which communicate with grooves 8 for the attachment of receiving and delivering pipes and means for retaining the parts in position.

3. A cooler for beverages comprising separable inner and outer cylinders having a space between them, ring-shaped or open heads having connecting-grooves 5 and 8, shoulders 9 and recesses 14, packing-washers having openings 11 lying between the ends of the cylinders and the shoulders, hubs which communicate with grooves 8 for the attachment of receiving and delivering pipes and rings 15 lying in recesses 14 and provided with outwardly-projecting ears to receive bolts by which the parts are held together.

4. A cooler for beverages comprising separable inner and outer cylinders having a space between them and enlargements 4 at their ends, ring-shaped or open heads having connecting-grooves 5 and 8, and shoulders 9, packing-washers having openings 11 lying between the enlargements at the ends of the cylinders and the shoulders, hubs which communicate with grooves 8 for the attachment of receiving and delivering pipes and means for retaining the parts in position.

In testimony whereof I affix my signature in presence of two witnesses.

LEOPOLD BAUMEISTER.

Witnesses:
  A. M. WOOSTER,
  S. V. HELEY.